March 17, 1964 G. O. SMITH ETAL 3,125,427
FILTER
Filed Aug. 3, 1961
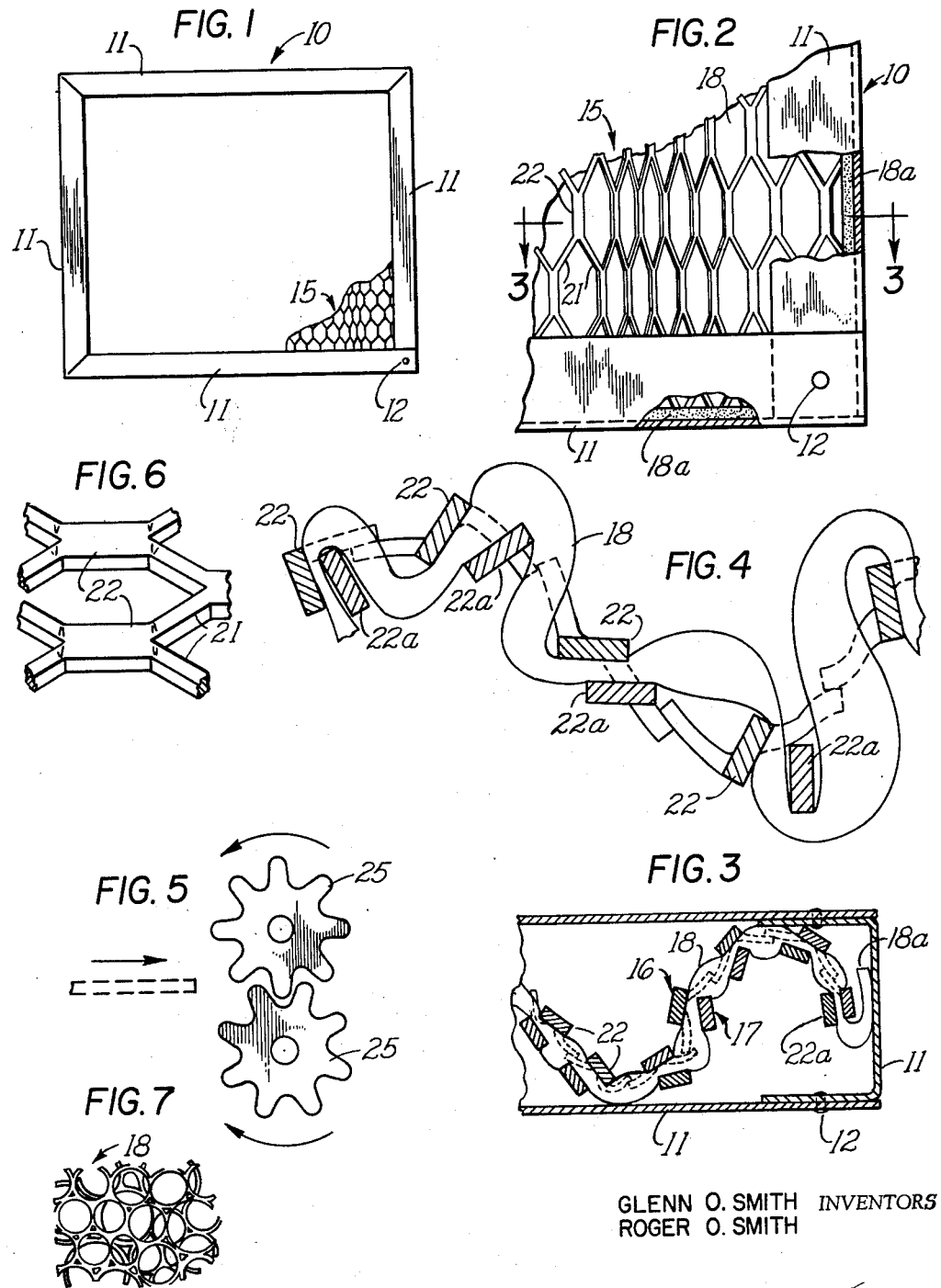
GLENN O. SMITH INVENTORS
ROGER O. SMITH
BY Roger C. Johnson
ATTORNEY

United States Patent Office 3,125,427
Patented Mar. 17, 1964

3,125,427
FILTER
Glenn O. Smith and Roger O. Smith, Moline, Ill., assignors to Smith Filter Corporation, Moline, Ill., a corporation of Illinois
Filed Aug. 3, 1961, Ser. No. 129,058
1 Claim. (Cl. 55—500)

This invention relates generally to filters and particularly to air filters.

The object and general nature of this invention is the provision of a filter constructed of a pair of corrugated expanded metal sheets with a layer of filter material, preferably a porous flexible filamentary plastic, such as a flexible polyurethane having a porosity of 30 pores per lineal inch and a three dimensional structure of skeletal strands, therebetween. A further feature of this invention is the provision of a filter of the above type, wherein the corrugations formed are produced mainly by distorting or twisting of the strands of the expanded metal sheets, so that the uncut webs or bars are disposed in random orientation in the corrugated sheet. Thus, when the two expanded metal sheets are pressed closely together during the passage of the sheets between the corrugating rolls, these webs or bars are pressed into the filter layer and the filamentary material thereof are forced over the edges of the webs or bars, and also over the adjacent strands, particularly the strands and webs or bars at the points of sharpest bends, as at the tops and bottoms of the corrugations. This tends to hold the sheets together.

These and other objects and advantages of this invention will be apparent to those skilled in the art after a consideration of the following detailed description of the preferred embodiment, taken in conjunction with the accompanying drawings, in which:

FIG. 1 is a face view of a filter constructed according to this invention.

FIG. 2 is a fragmentary face view taken at an enlarged scale, with certain parts shown in section.

FIG. 3 is an enlarged view taken along the line 3—3 of FIG. 2, the filter element being shown somewhat diagrammatic.

FIG. 4 is a further enlarged fragmentary view of the corrugated filter element, showing the manner in which the layer of filamentary polyurethane engages the bars and strands of the corrugated expanded metal sheets and holds them together.

FIG. 5 is an explanatory view, illustrating how the assembly of two flat expanded metal sheets with a layer or sheet of filamentary filter material is corugated or pressed into corrugated form to form a self-sustaining filter element.

FIG. 6 is an enlarged view of a portion of one of the expanded metal sheets.

FIG. 7 is an enlarged fragmentary view of the filamentary polyurethane filter layer.

Referring first to FIG. 1, the filter of this invention incorporates a frame 10 formed of channel stock, as will be seen from FIG. 3, and slit at spaced points to form a generally rectangular frame, portions of the flanges 11 overlapping at one of the corners to form a connection that is secured by a rivet 12.

The filtering element of the unit 10 is indicated at 15. This element is of special construction. Essentially, it comprises two sheets of expanded metal, indicated at 16 and 17, and a layer or sheet 18 of flexible polyurethane, which is in the nature of a urethane foam having a three dimensional structure of skeletal strands, as best illustrated in FIG. 7. This material serves admirably as filtering means and, what is more important, cooperates in a particular manner with the expanded metal sheets to form a self-sustaining filter element when the layer of plastic material is placed between two sheets of expanded metal and then the assembly passed through or between the rolls of a corrugating machine shown diagrammatically in FIG. 5. Preferably, the material 18 is larger than the size of the sheets of expanded metal, so that portions 18a extend outwardly to seal against the frame of the filter, as shown in FIG. 2.

Expanded metal as it comes from the slitting and stretching machine appears generally as shown in FIG. 6 and is in the form of relatively narrow stretched strands 21 and wider webs or bars 22, relatively short and wide in configuration and interconnected by the strands 21.

When the assembly of a pair of expanded metal sheets with a layer of plastic material of the foamed type therebetween is passed through the corrugating machine the expanded metal sheets are bent into interfitting ridges and valleys with the filtering layer 18 interlocked therebetween. Actually, as illustrated in FIG. 4, the deformation of the expanded metal sheets takes place largely by virtue of twisting of the strands, the more rigid webs or bars 22 being relatively unchanged, especially if they are slightly cupped, as some expanded metal is produced. This arrangement, that is, the compressible layer of filamentary material more or less compressed between the corrugated expanded metal sheets, and the webs or bars of the latter disposed in generally random angularity, causes the filamentary material to interengage with the strands and webs or bars and hold the two sheets of expanded metal interconnected so that they will withstand considerable handling without becoming separated. The manner in which the filamentary material is compressed between the strands and bars of the expanded metal sheets is illustrated in FIG. 5.

When the assembly is passed between the corrugating rolls 27 (FIG. 4), the metal sheets are pressed quite close together. Bending of the sheets into corrugated form is, as mentioned above, accomplished mainly by twisting of the individual strands while the webs or bars 22 take different angular positions, by virtue of which at least some of the bars, and also the strands, or some of them, move substantially to positions one behind the other, or partially so, with the associated portions of the plastic layer compressed therebetween and with adjacent portions of the plastic expanding and partially embracing adjacent corners or edges of the bars and strands.

Thus, the plastic layer between the expanded corrugated metal sheets serves not only as a filter per se but also as means interconnecting the metal sheets and holding them together.

More specifically, and with special reference to FIG. 4, after the assembly of two expanded metal sheets and polyurethane layer therebetween is passed through the corrugating rolls (FIG. 5) the bars 22 of one expanded metal sheet are at least partially interlocked with the bars 22a of the companion sheet, both sets of bars lying at random angles, due mainly to the fact that the deformation of the sheets during the corrugating action takes place by twisting and bending the strands 21. At the same time, the pressure exerted by the rolls 25 (FIG. 5) brings the two sheets of expanded metal relatively close together, compressing the sheet of polyurethane. However, the latter material readily expands into the interstices, as illustrated in FIG. 4, and, in effect, produces an interlocking action between the two sheets of expanded metal, so that after corrugation the assembly remains intact and will withstand considerable handling, as may occur when the corrugated filter element is assembled into a frame (FIGS. 1 and 3).

While we have shown and described above the preferred form of our invention, it is to be understood that our invention in its broader aspects is not to be limited to the specific structure, shown and described above, but that widely different means may be employed in the practice of the broader aspects of our invention.

What we claim, therefore, and desire to secure by Letters Patent is:

A filter including two sheets of expanded metal, each sheet having a plurality of bars and strands interconnecting corner portions of said bars, the bars of each sheet extending in lines transverse of the sheet, said strands being dimensionally smaller than said bars and extending generally diagonally relative to said bars, a layer of porous flexible compressible filamentary plastic disposed between said sheets of expanded metal, said sheets being corrugated generally parallel to said transverse lines to provide ridges and valleys in nesting relation with the layer of filamentary plastic compressed therebetween, certain of the strands and bars of one metal sheet being interengaged with certain of the strands and bars of the adjacent sheet, with the filamentary layer compressed in and around the interengaging parts.

References Cited in the file of this patent

UNITED STATES PATENTS

| | | |
|---|---|---|
| 2,008,800 | Somers | July 23, 1935 |
| 2,082,481 | Christofferson | June 1, 1937 |
| 2,341,097 | Heebink | Feb. 8, 1944 |
| 2,991,843 | Bell | July 11, 1961 |